United States Patent [19]

Carlson

[11] Patent Number: 4,599,652
[45] Date of Patent: Jul. 8, 1986

[54] DUAL CHANNEL IF TV RECEIVER WITH AFT DERIVED FROM THE PICTURE CARRIER IN THE SOUND CHANNEL

[75] Inventor: David J. Carlson, Indianapolis, Ind.

[73] Assignee: RCA Corporation, Princeton, N.J.

[21] Appl. No.: 581,127

[22] Filed: Feb. 17, 1984

[51] Int. Cl.[4] .......................... H04N 5/50; H04B 11/16
[52] U.S. Cl. .................................. 358/195.1; 455/182
[58] Field of Search ..................... 358/195.1; 455/182, 455/263, 204

[56] References Cited

U.S. PATENT DOCUMENTS 2,891,105  6/1959  Keizer .

FOREIGN PATENT DOCUMENTS 2645567  4/1977  Fed. Rep. of Germany ... 358/195.1
546830   7/1941  United Kingdom .
1546458  5/1979  United Kingdom .

*Primary Examiner*—James J. Groody
*Assistant Examiner*—John K. Peng
*Attorney, Agent, or Firm*—Eugene M. Whitacre; Henry I. Steckler; Peter M. Emanuel

[57] ABSTRACT

A quasi-parallel IF television receiver derives the AFT voltage from a video carrier in the sound IF channel. Since the signals in the sound IF channel do not pass through the VSB filter, asymmetries in the AFT loop response are avoided. This results in better operation of the AFT control loop.

7 Claims, 3 Drawing Figures

DUAL CHANNEL IF TV RECEIVER WITH AFT DERIVED FROM THE PICTURE CARRIER IN THE SOUND CHANNEL

The present invention relates to dual channel television (TV) receivers, and more particularly, to an improved automatic fine tuning (AFT) circuit.

In the U.S., television receivers use a tuner that converts a selected RF television signal to an intermediate frequency (IF) range of 41–47 MHz. The IF signal is processed in an IF section which comprises a vestigal sideband (VSB) filter with an idealized characteristic 10 as shown in FIG. 1a that attenuates the picture carrier at 45.75 MHz by 6 db as is indicated by sloped portion 12 of the characteristic. The VSB filter is required to provide proper amplitude versus frequency shaping for the picture carrier and its sidebands. An AFT circuit including a detector coupled to the IF section is used to correct for frequency offsets of the local oscillator of the tuner or of an RF signal provided by a cable system. The AFT detector is a frequency modulation (FM) discriminator having a transfer characteristic as shown by curve 14 in FIG. 1b with a center frequency at the picture carrier frequency. The resultant AFT response results from the combination of the characteristics shown in FIGS. 1a and 1b and as shown in FIG. 1c, comprises a large low frequency portion 16 and a relatively smaller high frequency portion 18. This asymmetrical response caused by the VSB IF filter results in several problems. Since the area under portion 16 is larger than that under portion 18, under weak signal conditions when a substantial amount of noise is present, portion 16 contributes a greater component of one polarity of rectified and integrated noise than portion 18 contributes to the opposite polarity. This results in a D.C. offset that inhibits correct AFT operation, unless the D.C. offset is compensated for. Further, the bandwidth of portion 16 is greater than that of portion 18. The narrow bandwidth of portion 18 makes it more likely that a positive frequency offset of the local oscillator signal or a negative frequency offset of a received RF signal will be outside the pull-in range of the AFT circuit, thereby preventing proper AFT operation. Still another problem is that since the picture carrier is attenuated 6 db by the VSB filter, AFT operation for weak RF signals with negative frequency offsets may be hampered.

Recently, attention has been given to the so called "quasi-parallel" IF arrangements in which the IF signal is filtered differently in separate channels. In the picture channel a VSB filter is employed for the reasons given above. In the sound channel a filter with two peaked response, one at the picture carrier frequency and one at the sound carrier frequency is used. Thereafter the two carriers are mixed to produce a 4.5 MHz sound carrier for demodulation. This reduces the amount of audio "buzz". Such audio buzz arises in conventional single IF channel arrangements in which both the sound and picture carriers of the IF signal are passed through a VSB filter and thereafter mixed together to produce a 4.5 MHz modulated sound carrier due to incidental phase modulation (IPM) of the picture carrier introduced by sloped portion 12 of the VSB filter characteristic shown in FIG. 1a. The use of quasi-parallel IF arrangements is particularly desirable in television receivers with stereo sound provisions due to the increased amount of audio buzz due to the greater bandwidth of the transmitted stereo sound components. In such quasi-parallel arrangement the AFT signal is derived in response to the picture carrier processed in the video channel with the VSB filter. Accordingly, the AFT signal derived in such quasi-parallel receiver has all of the problems of the single IF channel receiver described above.

It is herein recognized that when the picture and sound carrier are processed in separate or quasi-parallel channels there is an opportunity to overcome these problems.

In accordance with a principle of the invention, a television receiver has separate IF channels for the sound and picture signals. Since a VSB filter is present only in the picture channel, the picture carrier in the sound channel is advantageously used to derive the AFT signal. Thus, the problems stemming from having a VSB filter in the channel from which the AFT signal is derived are significantly reduced if not altogether avoided.

DETAILED DESCRIPTION

Figure 2:
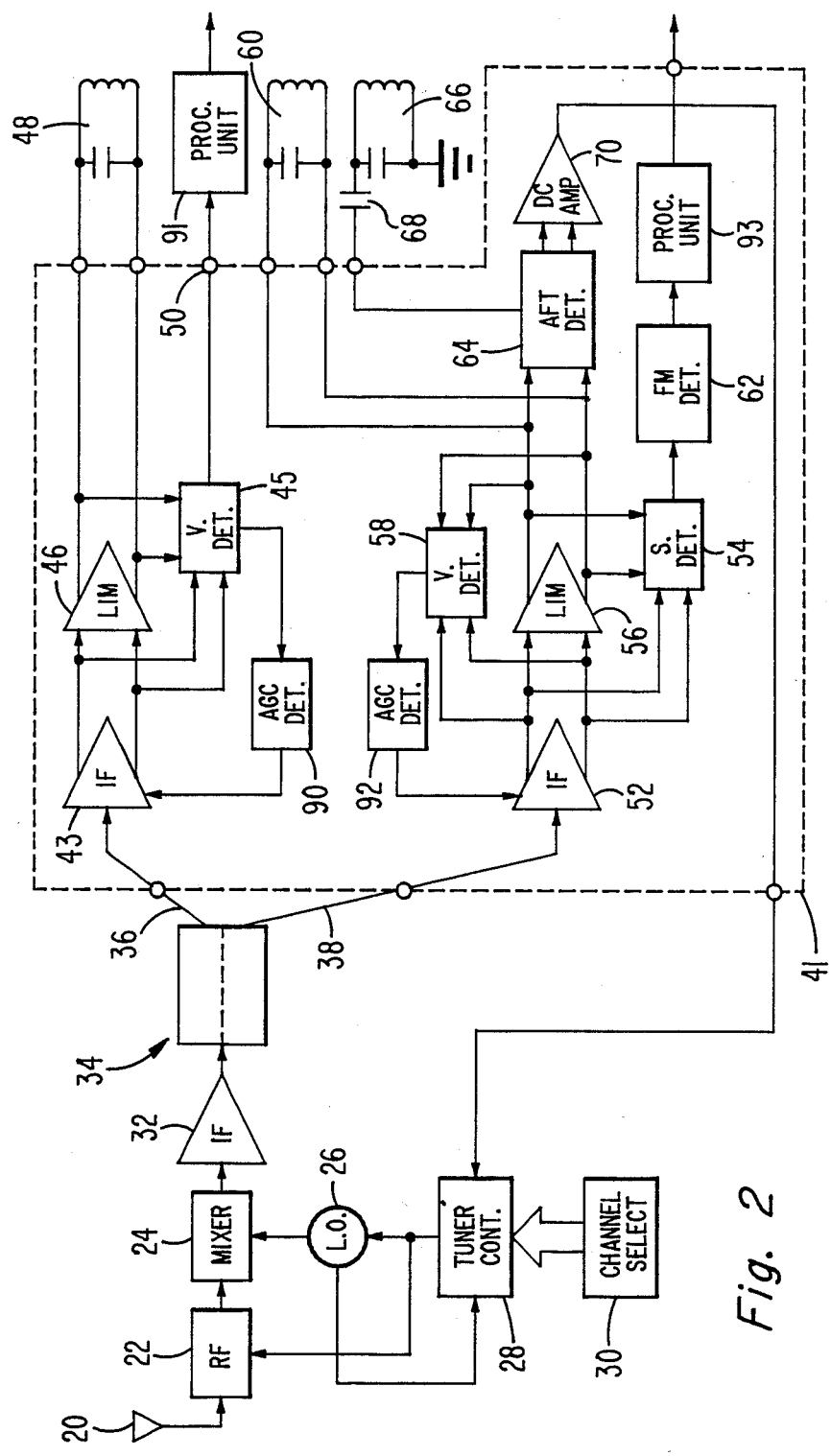
FIG. 2 is a block diagram of a television receiver constructed in accordance with the invention.

In FIG. 2, an antenna 20 receives RF signals which are applied to RF amplifier 22 having tuned circuits for selecting the RF signal corresponding to a particular desired channel in response to a tuning voltage generated by a tuner control circuit 28. The amplified RF signal of the selected channel is applied to a mixer 24. Also applied to mixer 24 is a local oscillator signal from local oscillator 26 whose frequency is also controlled by the tuning voltage generated by tuner control circuit 28. The frequency of local oscillator 26 is controlled such that the IF output signal of mixer 24 has the conventional 41–47 MHz range.

Tuner control circuit 28 may, e.g., include a phase locked loop for generating the tuning voltage for controlling local oscillator 26 (and RF amplifier 22) in response to a digital word representing the channel number of the selected channel as provided by a channel selection unit 30. Such a system is described in U.S. Pat. No. 4,031,549 issued in the name of Rast et al.

Figure 1:
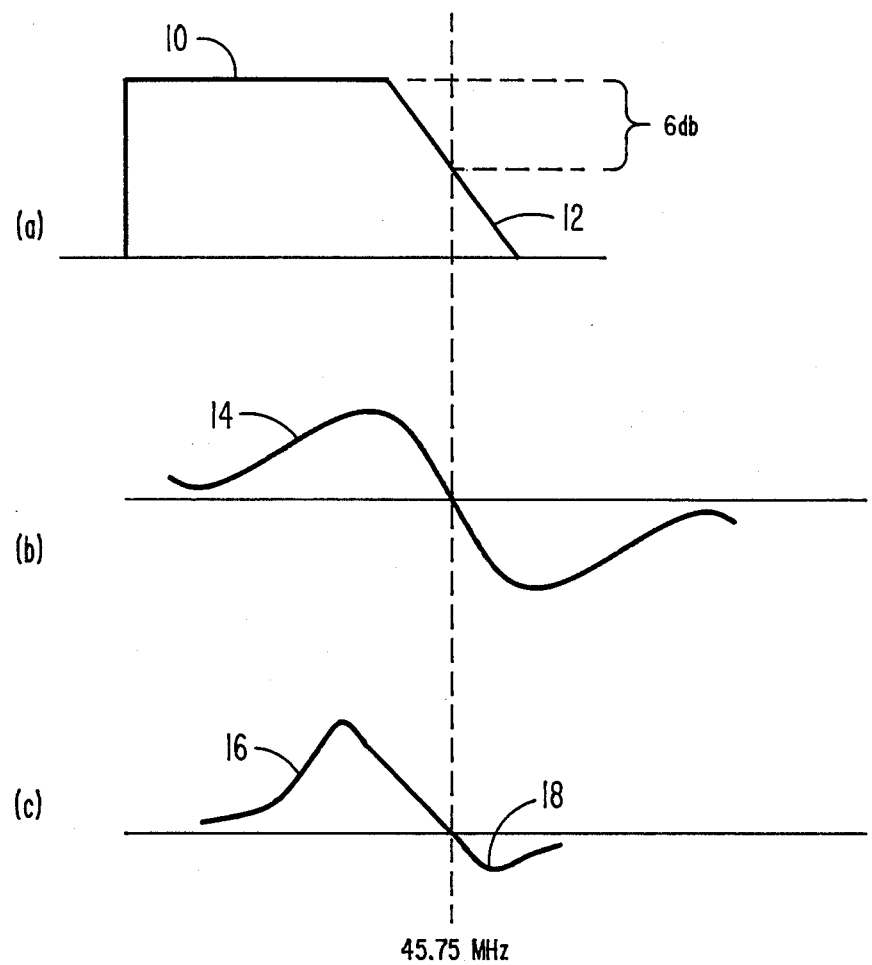
FIG. 1 referred to above shows amplitude versus frequency characteristics useful in understanding the prior art.
Figure 3:
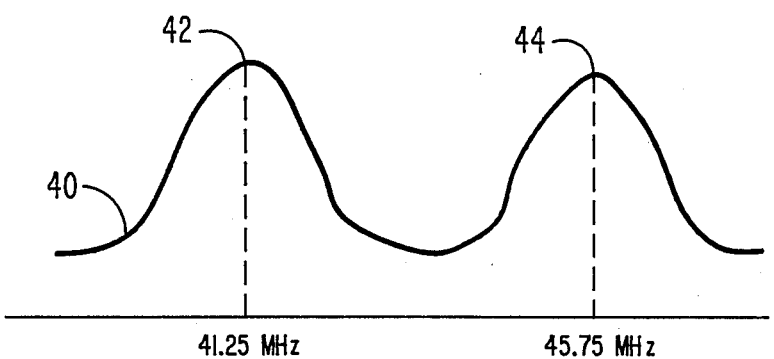
FIG. 3 is an amplitude versus frequency characteristic useful in explaining the operation of the structure shown in FIG. 1.

The IF signal is amplified by an IF amplifier 32 and thereafter coupled to IF filter 34 of the surface acoustic wave (SAW) type. In particular, this filter has dual outputs 36 and 38 having different frequency transfer characteristics. Output 36 has a conventional VSB filter response as shown in FIG. 1a and described above, e.g., it attenuates the picture carrier at 45.75 MHz by 6 db. Output 38 has a double peaked response as shown in FIG. 3 by curve 40. Peak 42 is at the sound carrier frequency of 41.25 MHz, while peak 44 is at the picture carrier frequency of 45.75 MHz. The peaks 42 and 44 are of substantially equal amplitude. A suitable SAW filter is the type F1802 known commercially as the "Double IF (PIF-SIF)" SAW, manufactured by Toshiba Corporation. If desired, separate filters respectively having the above described frequency responses could be used. The filters could be of either SAW or discrete element type.

The outputs 36 and 38 are applied to a dual channel IF circuit 41 such as integrated circuit (IC) type T2899, manufactured by Toshiba Corporation, with such changes as described below. Circuit 41 is shown in simplified form in FIG. 2. The signal at output 36 is applied to IF amplifier 43. The output signal from amplifier 43 is applied to balanced signal inputs of synchronous video detector 45 and limiter 46. The balanced outputs of limiter 46 are coupled to an external tank circuit 48, which is turned to the picture carrier frequency of 45.75 MHz and to balanced reference inputs of video detector 45. Synchronous video detector 45 beats the video IF signal with the video carrier to provide a composite video signal at output 50. An automatic gain control (AGC) signal is provided to amplifier 43 from AGC detector 90 coupled to detector 45. The composite video signal is applied to picture processing unit 91.

The output signal at output 38 of SAW filter 34 is coupled by way of IF amplifier 52 to sound detector 54, limiter 56, and video detector 58. The balanced output signals of limiter 56 are coupled to external tank circuit 60, which is tuned to 45.75 MHz, and to the balanced reference inputs of sound detector 54 and video detector 58. Video detector 58 is a synchronous detector and used to provide an AGC output signal by way of AGC detector 92 to IF amplifier 52. Sound detector 54 beats the sound IF signal with the picture carrier to provide a 4.5 MHz intercarrier sound output signal to FM detector 62. Detector 62 provides a baseband audio signal for further processing e.g., de-emphasis and amplification, by an audio processing unit 93.

Conventionally, an AFT detector is coupled to the output of limiter 46. In this case, the picture carrier reference signal has been passed through a VSB filter with all of the disadvantages of the prior art described above. However, in accordance with the principle of the invention, AFT detector 64 is coupled to the output of limiter 56. Synchronous AFT detector 64 cooperates with an external tank circuit 66 turned to 45.75 MHz, which circuit 66 is coupled to detector 64 through quadrature phase shift capacitor 68 to produce an FM discriminate-like output characteristic and thereby generate an AFT signal representing the deviation of the picture carrier from 45.75 MHz. The AFT signal produced by detector 64 has the symmetrical output signal versus frequency response shown in FIG. 1b because the picture carrier from which it is derived has not been passed through a VSB filter.

The AFT signal is amplified by a D.C. amplifier 70 and then coupled to tuner control circuit 28. When the phase locked loop has completed its operation, i.e., it is locked, the AFT signal is applied to local oscillator 26 as is explained in the aforementioned Rast et al. patent.

What is claimed is:

1. Apparatus comprising:
 a mixer having a first input for receiving RF television signals, a second input for receiving a local oscillator signal, and an output for providing an IF signal including a video and a sound carrier;
 local oscillator means for generating said local oscillator signal and controlling its frequency in response to a control signal applied to a frequency control input;
 a video channel including vestigal sideband filter means coupled to the output of said mixer for providing a first filtered version of said video carrier of said IF signal, and video detector means responsive to said first filtered video carrier for providing a baseband video signal;
 an audio channel including filter means separate from said vestigal sideband filter means and coupled to the output of said mixer for providing a second filtered version of said video carrier of said IF signal and a filtered version of said sound carrier of said IF signal, and audio detector means responsive to said second filtered video carrier and said filtered sound carrier for providing a baseband audio signal; and
 AFT means coupled to said audio channel for deriving an automatic fine tuning (AFT) signal representing the deviation of the frequency of said video carrier of said IF signal from its nominal value in response to said second filtered video signal, said AFT signal being applied to said frequency control input of said local oscillator means.

2. Apparatus as claimed in claim 1, wherein said filter means of said audio channel exhibits peaked responses at the frequencies of said sound and video carriers of said IF signal, respectively.

3. Apparatus as claimed in claim 1, wherein said AFT means comprises an AFT frequency discriminator detector receiving said second filtered video carrier processed in said audio channel.

4. Apparatus comprising:
 a mixer having a first input for receiving RF television signals, a second input for receiving a local oscillator signal, and an output for providing an IF signal having video and sound signal components;
 local oscillator means for providing a local oscillator signal to said second input and having a frequency control input;
 a video channel including a vestigal sideband filter means coupled to said mixer output for providing a first representation of said video signal component of said IF signal and video detector means; and
 an audio channel including means coupled to said mixer output for providing a second representation of said video signal component of said IF signal without passing through said vestigal sideband filter means and a representation of said sound signal component of said IF signal, and said audio channel further including an AFT means for deriving an automatic fine tuning voltage representing the deviation of the frequency of said video carrier of said IF signal from a nominal value in response to said second representation of said video signal component of said IF signal and for applying said automatic fine tuning voltage to said frequency control input.

5. Apparatus as claimed in claim 4, wherein said sound and video signal components of said IF signal include video and sound carriers, respectively, and said audio channel comprises filter means exhibiting peaked responses at the frequencies of said sound and video carriers, respectively for providing said second representation of said video signal component of said IF and said representation of said sound signal component.

6. Apparatus as claimed in claim 4, wherein said audio channel comprises sound detector means for mixing said representation of said sound signal component of said IF signal and second representation of said video signal component of said IF signal to produce an intercarrier sound signal.

7. Apparatus as claimed in claim 4, wherein said AFT means comprises an AFT frequency discriminator detector receiving said second representation of said video signal component of said IF signal.

* * * * *